United States Patent [19]
Vander Meiden et al.

[11] Patent Number: 5,818,921
[45] Date of Patent: Oct. 6, 1998

[54] SIGNALING SYSTEM AND METHOD FOR ENABLING PBX-PBX FEATURE TRANSPARENCY ACROSS A SWITCHED PUBLIC NETWORK

[75] Inventors: David Vander Meiden, Boca Raton, Fla.; Randy Wuerfel, Santa Clara, Calif.

[73] Assignee: Siemens Business Communication Systems, Inc., Santa Clara, Calif.

[21] Appl. No.: 616,022

[22] Filed: Mar. 14, 1996

[51] Int. Cl.$^6$ .............................. H04M 7/00; H04M 3/42; H04J 3/12; H04Q 11/00
[52] U.S. Cl. ..................... 379/225; 370/385; 370/467; 370/522; 379/207; 379/230
[58] Field of Search ................................. 379/207, 219, 379/220, 225, 229, 230, 232; 370/384, 385, 522, 466, 467

[56] References Cited

U.S. PATENT DOCUMENTS

| | | | |
|---|---|---|---|
| 4,488,004 | 12/1984 | Bogart et al. | 379/225 |
| 5,182,750 | 1/1993 | Bales et al. | 379/230 X |
| 5,521,970 | 5/1996 | Herrick et al. | 379/225 X |
| 5,550,906 | 8/1996 | Chau et al. | 379/229 X |

Primary Examiner—Harry S. Hong

[57] ABSTRACT

A method and system for supporting private branch exchange features over a public switched network is provided. The proprietary private branch exchange call and feature control information is separated into standard ISDN public network protocol elements and proprietary ISDN protocol elements. The interface between the originating private branch exchange and the public switched network inserts the proprietary protocol elements into a UUS service data packet for transparently transmission to the destination private branch exchange. Thus, the proprietary private branch exchange feature control information can be recovered and utilized by the destination private branch exchange, thus permitting PBX-PBX feature transparency through a switched public ISDN network.

8 Claims, 2 Drawing Sheets

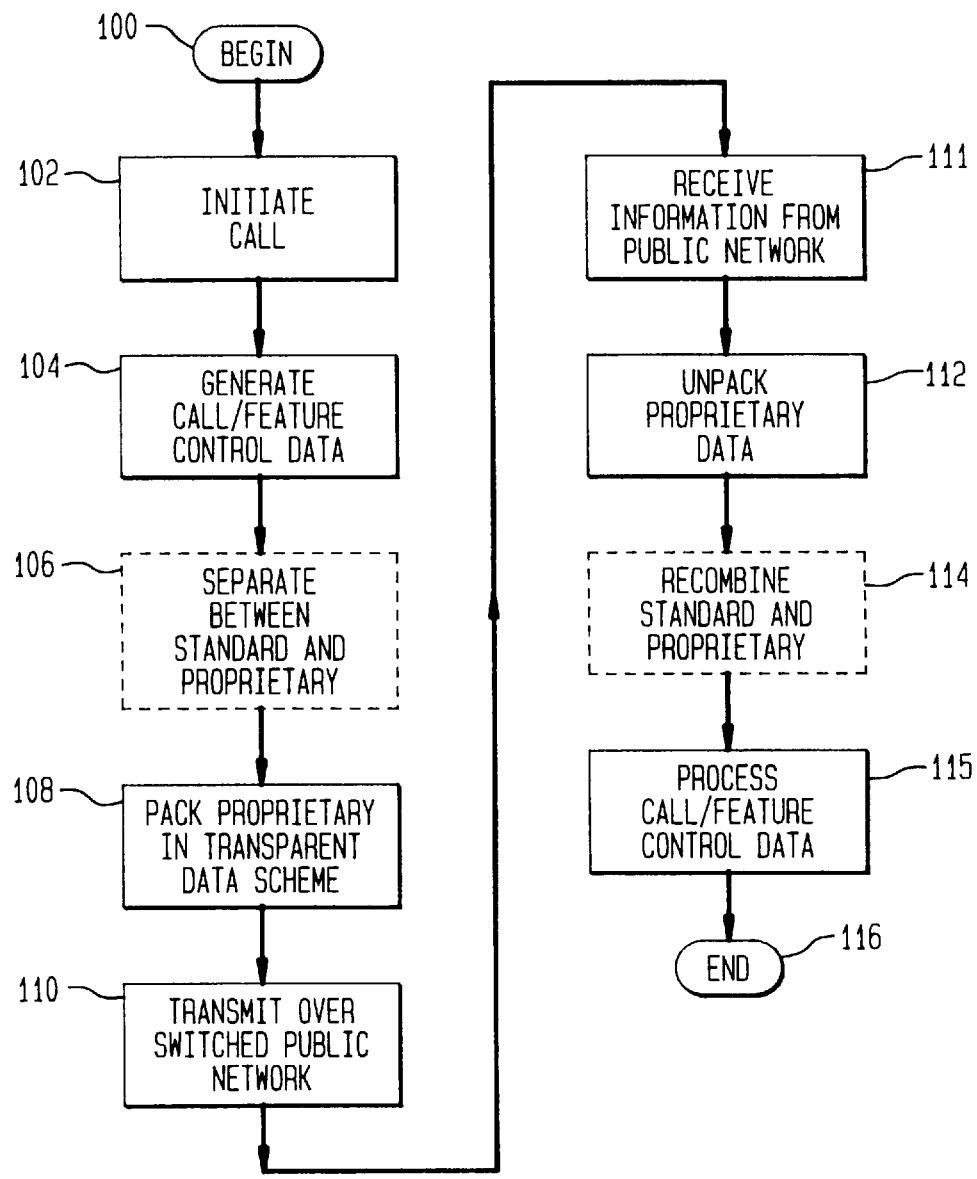

SIGNALING SYSTEM AND METHOD FOR ENABLING PBX-PBX FEATURE TRANSPARENCY ACROSS A SWITCHED PUBLIC NETWORK

FIELD OF THE INVENTION

The present invention generally relates to a signaling mechanism for use with a PBX-based telecommunication network. More particularly, the invention relates to a signaling mechanism that uses switched public integrated services digital network (ISDN) connections for communicating between the private branch exchange (PBX) of various branch locations while maintaining PBX-PBX feature transparency.

BACKGROUND OF THE INVENTION

In public ISDNs, customer premises equipment (CPE) must comply with rigid ISDN signaling protocol requirements to access available ISDN calling services (e.g., INWATS, OUTWATS, virtual private networking). To activate ISDN features such as call transfer supported by the public ISDN, CPE similarly must satisfy precise protocol requirements. Consequently, PBX-PBX feature transparency across a switched public ISDN connection is possible only when the public ISDN and the PBXs support a common set of ISDN signaling protocol requirements defined for a particular ISDN feature. Since existing public ISDNs support a select few ISDN features, minimal PBX-PBX feature transparency is possible.

PBX vendors have developed robust private ISDNs that support numerous PBX features in a seamless manner in order to provide a single-system image to users. To realize the single-system image capability, extensions to standardized ISDN signaling protocols, i.e., proprietary ISDN signaling protocols, have been developed. However, the proprietary ISDN signaling protocols are not compatible with public ISDN signaling protocol requirements. Thus, when placing a call between PBXs across a switched public ISDN connection, proprietary ISDN signaling protocols cannot be used, even if the two PBXs involved in the connection both support the same proprietary ISDN signaling protocol.

Maximum PBX-PBX feature transparency is possible only in the lone instance when digital leased lines, e.g., dedicated channels, interconnect the PBXs. Otherwise, when switched public ISDN connections are used to interconnect the PBXs, limited feature transparency can only be realized when both the public ISDN and the PBX support a common signaling protocol for controlling a particular ISDN feature.

Businesses are left with two choices when implementing a private ISDN. Businesses can maximize PBX-PBX feature transparency or maximize cost savings.

To maximize PBX-PBX feature transparency, a business can interconnect various branch locations using digital leased lines. Digital leased lines permit proprietary feature control signaling to be transmitted on the ISDN primary rate interface common signaling channel, the D-channel, between PBXs which provides maximum PBX-PBX feature transparency. However, the cost of implementing digital leased lines can be very expensive depending on the distance and quantity of digital leased line circuits required to interconnect all of the PBXs of the private network for the business.

To maximize cost savings, a business can interconnect various branch locations using switched public ISDN connections, e.g., a virtual private network. The trunking expense of using switched public ISDN connections is typically far less when compared to the cost of using digital leased lines. Nevertheless, only limited PBX-PBX feature transparency can be realized when using switched public ISDN connections to interconnect the branch locations for a business. Thus, in reality the only avenue for maximizing feature transparency from one PBX to another PBX is to utilize dedicated channels (digital leased lines) because very few features are supported transparently through the public ISDN.

SUMMARY OF THE INVENTION

The present invention solves the aforementioned problems by providing a signaling mechanism that enables PBX-PBX feature transparency across a switched public ISDN connection.

Businesses that use PBX-based private telecommunication networks desire seamless operation of PBX features between PBXs, or PBX-PBX feature transparency so that their private network provides a single-system image to its users. These businesses also try to maintain telecommunication costs at low, affordable levels. The present invention provides a signaling mechanism that permits a business to use relatively low-cost switched public ISDN connections for communicating between the PBX of various branch locations of the business while maintaining PBX-PBX feature transparency. According to the present invention, proprietary information related to the control of PBX features, including features such as call transfer and conferencing, is transmitted from an originating PBX to a destination PBX using a user-user signaling (UUS) service over the public ISDN. The proprietary information transmitted in user-user signaling service data packets does not undergo manipulation during transfer over the public ISDN, and thus provides the originating PBX and terminating PBX a signaling mechanism by which end-to-end feature transparency can be achieved.

An illustrative embodiment of the present invention includes a system for transporting private branch exchange features transparently across a switched public network. The system includes an originating private branch exchange having a call processing section for generating call/feature control data when a call is initiated, the call/feature control data including proprietary ISDN protocol elements and standard ISDN protocol elements, and a first interface for coupling the originating private branch exchange to the switched public network, the first interface receiving the call/feature control data from the call processing section, packing the proprietary ISDN protocol elements into a UUS service data packet, and transmitting the proprietary ISDN protocol elements packed in the UUS service data packet and the standard ISDN signaling protocol elements over the switched public network. The system further includes a destination private branch exchange having a second interface for coupling the destination private branch exchange to the switched public network, the second interface receiving the proprietary ISDN protocol elements in the UUS service data packet and the standard ISDN protocol elements, and unpacking the proprietary ISDN protocol elements from the UUS service data packet. The first interface may include a first interworking portion for sorting the call/feature control data into the standard ISDN protocol elements and the proprietary ISDN protocol elements and the second interface may include a second interworking portion for recombining the proprietary ISDN protocol elements in the UUS service data packet with the standard ISDN protocol elements to obtain the call/feature control data.

An illustrative method for transporting private branch exchange features transparently across a switched public network involves a series of steps. These steps include initiating a call from an originating private branch exchange, generating call/feature control data responsive to initiating the call, the call/feature control data including standard ISDN protocol elements and proprietary ISDN protocol elements, packing the proprietary ISDN protocol elements into a UUS service data packet, transmitting the proprietary ISDN protocol elements in the UUS service data packet and the standard ISDN protocol elements over a switched public network to a destination private branch exchange, and unpacking the proprietary ISDN protocol elements from the UUS service data packet. Further, an illustrative method may include the steps of separating the call/feature control data into the standard ISDN protocol elements and the proprietary ISDN protocol elements before packing the proprietary ISDN protocol elements in the UUS service data packet, and after unpacking the proprietary ISDN protocol elements from the UUS service data packet, recombining the proprietary ISDN protocol elements and the standard ISDN protocol elements to form the call/control feature data.

BRIEF DESCRIPTION OF THE DRAWINGS

A more complete appreciation of the present invention and many of the advantages thereof will be readily obtained as the invention becomes better understood by reference to the following detailed description when considered in connection with the accompanying drawing.

FIG. 2 is a flow chart of the preferred method of the present invention.

DETAILED DESCRIPTION OF THE PREFERRED EMBODIMENTS

Figure 1:
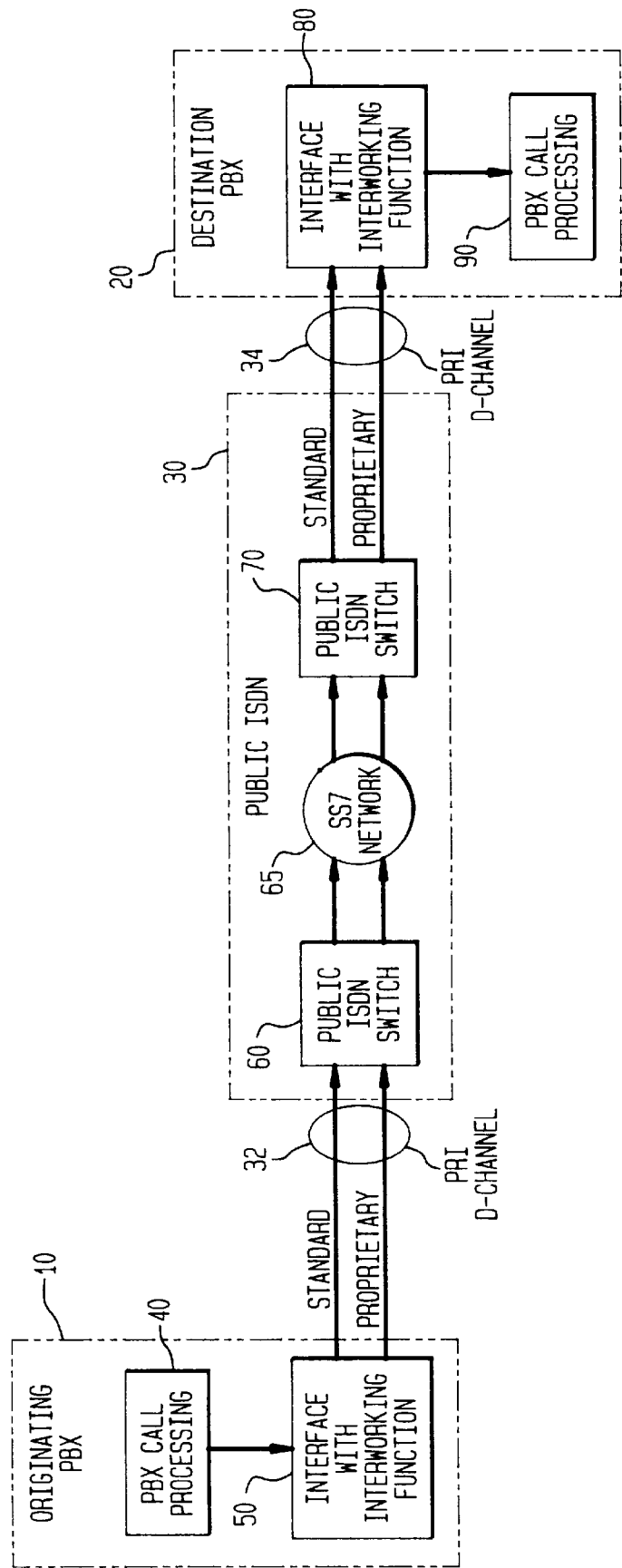
FIG. 1 shows an illustrative embodiment of an implementation of the signaling mechanism according to the present invention.

For the sake of convenience, the present invention will be described in terms of an exemplary user-user signaling (UUS) service used in conjunction with a typical switched public ISDN. However, it should be understood that the present invention may be used in conjunction with any other known or future transparent data transport scheme for use with public ISDNs.

To achieve PBX-PBX feature transparency for PBXs interconnected using switched public ISDN connections, the present invention utilizes the UUS service.

A common carrier that supports ISDN, or a public ISDN, provides network access via an ISDN primary rate interface consisting of 23 bearer channels, i.e., "B channels", and one common signaling channel, i.e., "D channel".

Public ISDNs are now initiating a new ISDN service called user-user signaling (UUS). UUS is offered as an ISDN primary rate interface (PRI) service that may be used in conjunction with a public ISDN virtual private networking (VPN) calling service. UUS is a general data transport service that permits customers premises equipment (CPE), e.g., a PBX, interfaced with the public ISDN to send and receive data packets of user-defined information via the PRI D-channel, to and from a far-end CPE through the public ISDN. The far-end CPE may transmit or receive the data packets of user-defined information via its PRI D-channel. The public ISDN transports the data packets transparently, that is, without interpreting or modifying the data packets.

AT&T has deployed an exemplary version of a UUS service and other competitors are likely to follow suit. A written description of an illustrative UUS service and its operation and implementation is described in "AT&T Network Integrated Services Digital Network (ISDN) Primary Rate Interface and Special Applications Specification," Technical Reference 41459, August 1995, Section 3.9, which is herein incorporated by reference.

AT&T's UUS service is supported in conjunction with AT&T's Software Defined Network (SDN) virtual private network service. AT&T's UUS service supports the following sub-services: 1) message associated user-user information (MA-UUI); 2) call associated temporary signaling connection (CA-TSC); and 3) non-call associated temporary signaling connection (NCA-TSC).

The MA-UUI sub-service allows user-user information to be exchanged within ISDN layer-3 call control messages while establishing and clearing an ISDN circuit-mode call. In most ISDN standards bodies, MA-UUI is referred to as "UUI service 1".

The CA-TSC sub-service allows user-user information to be exchanged using ISDN layer-3 user information messages both while establishing and during the active (i.e., through-connected) state of an ISDN circuit-mode call. Sending user information (USER INFO) messages during call establishment and during the active state are respectively referred to as "UUI service 2" and "UUI service 3" in most ISDN standards bodies.

The NCA-TSC sub-service allows user information to be exchanged using ISDN layer-3 user information (USER INFO) messages on a call reference not associated with an ISDN circuit-mode call. NCA-TSC type service is referred to as a "User Signaling Bearer Service (USBS)" in most ISDN standards bodies.

No specific applications for using the UUS service have been defined by AT&T or other public ISDN vendors. Rather such applications have been left to the imagination of the CPE vendor. To date, information passed via the UUS service includes file transfers, for example during a voice call.

An exemplary implementation of the present invention will be described with reference to FIG. 1.

When a user in a first private branch exchange (PBX) 10 places a call to a user in another PBX 20, the originating PBX 10 establishes a basic B-channel (talk path) connection in accordance with ISDN signaling protocol requirements of the public ISDN 30. Contemporaneously, the originating PBX 10 establishes a connection on the D-channel 32, 34, that is a CA-TSC connection for the call. MA-UUI service is supported without a specific request for the service.

Once the B-channel connection and CA-TSC connection have been established, all proprietary ISDN signaling information generated by the originating PBX 10 related to PBX feature control is encapsulated in UUS data packets and passed transparently through the public ISDN 30 via the CA-TSC connection on the D-channel 32, 34. The far-end or destination PBX 20 receives the UUS data packets and processes the proprietary ISDN signaling information as if the originating PBX 10 and destination PBX 20 were interconnected with digital leased lines.

The sorting of standardized ISDN signaling protocol elements from proprietary ISDN signaling protocol elements and the packing of UUS packets can be performed by an interface 50 in the originating PBX 10, which may include an interworking function portion. Similarly, the unpacking UUS packets can be performed by an interface 80 in the destination PBX 20, which also may include an interworking function portion. These functions are totally transparent to the end-users involved in the call.

Private ISDN networks also support feature scenarios that require a PBX to signal feature control information to another PBX when no end-user is involved in placing a B-channel (talk path) connection. Rather than interact with an end-user, the originating PBX 10 can, for example, light a message waiting lamp on a telephone on a destination PBX 20. To support such a feature through a public ISDN 30, an originating PBX 10 establishes a connection on the D-channel 32, 34, without an associated basic B-channel, that is an NCA-TSC connection with a destination PBX 20 in accordance with the ISDN signaling protocol requirements of the public ISDN 30. Proprietary ISDN signaling information is encapsulated in UUS packets and passed transparently through the public ISDN 30 via the D-channel connection 32, 34. The destination PBX 20 receives the UUS packets and processes the encapsulated proprietary ISDN signaling information as if the originating PBX 10 and the destination PBX 20 were interconnected with digital leased lines.

It should be noted that the exemplary UUS service is partitioned into three different types of UUS signaling connections and that the present invention can work with these and other existing and future types of UUS signaling connections.

The following is an illustrative description of the system operation.

A user at the originating PBX 10 dials a phone number of another user/location within the defined PBX network which includes the destination PBX 20. After undergoing dialed digit analysis and route selection via the call processing section 40, the signaling information to be transmitted with the call is in the form of a combination of standardized and proprietary ISDN signaling protocol elements based on the PBX's proprietary ISDN signaling protocol employed. The call processing section includes standard hardware and software for the PBX network known in the art, such as the call processing implemented over digital leased lines. Each PBX network vendor has individualized feature control information which is part of the proprietary ISDN signaling protocol.

During call processing, the number dialed is looked up in routing tables to determine the best path to use to connect the call to the destination PBX 20. For example, the best path may be a public ISDN network (e.g., AT&T, MCI, Sprint, etc.) depending on how the routing tables are implemented. Once the path is selected, the call processing section 40 directs a stream of call/feature control data to an interface section 50 which includes a plurality of interfaces. The call/feature control data includes both standardized ISDN signaling protocol elements, which can be interpreted and processed by the public ISDN 30, and proprietary ISDN signaling protocol elements related to the control of PBX network features which will be passed transparently over the public ISDN 30 using UUS service.

The interface selected from the interface section 50 interfaces the originating PBX 10 to the public ISDN 30 via the PRI D-channel 32. Typically, there are multiple interfaces in interface sections 50. One interface in interface section 50 may modify call/feature control data for transmission over an AT&T public ISDN 30 while another interface in interface section 50 might modify call/feature control data for transmission over an MCI public ISDN 30. The selected interface in the interface section 50 sorts the call/feature control data into standardized ISDN signaling protocol elements and proprietary ISDN signaling protocol elements.

Currently, each public ISDN 30 has different requirements with respect to what constitutes standardized ISDN signaling protocol elements and what information can be passed transparently. Accordingly, it is necessary to use an interworking function portion in the interface section 50. The interworking function sorts the standard ISDN signaling protocol elements from the proprietary ISDN signaling protocol elements according to the requirements of the selected public ISDN 30. More specifically, the interworking function determines which data elements of the proprietary ISDN signaling protocol will be interpreted and processed by the public ISDN 30 and which data elements will be passed transparently (e.g., proprietary information for control of PBX features) through the public ISDN 30 in encapsulated data packets using the UUS service. Functionally, the data stream leaving the interface section on the D-channel 32 is still a single data stream with information resorted into encapsulated UUS information and public ISDN signaling protocol elements. In FIG. 1, two lines extend from the interface section 50 over PRI D-channel 32 to the public ISDN switch 60 of public ISDN 30. The two lines represent the sorted proprietary ISDN signaling protocol elements encapsulated in UUS service data packets and the standardized public ISDN signaling protocol elements. In reality, these two types of signaling elements are transmitted serially over a single physical D-channel.

The interworking function changes an incoming data signaling stream from one form to another. Generally, the interworking function converts the call/feature control data to be compatible with the public ISDN 30 over which the call will be routed. Converting may involve tweaking and adjusting bits of the call/feature control data to comply with the ISDN signaling protocol requirements of the public ISDN 30. Typically, the selected interface in interface section 50 employs one interworking function for the particular public ISDN 30 associated therewith.

Interworking functions are commonly known in the art and can be implemented with relative ease by those skilled in the art. For example, implementation of the interworking function can be realized in hardware with a software function being performed on the hardware which interfaces with the public ISDN 30.

Although the current implementation of the invention utilizes an interworking function in the interfaces in interface section 50, it is to be understood that it is possible to eliminate the interworking function. It is envisioned that a call processing section 40 will be developed in which the call/feature control data has been separated into standardized ISDN signaling protocol elements and proprietary ISDN signaling protocol elements at the time of formation, so that interworking the data elements will no longer be necessary and a selected interface section 50 can directly place the proprietary elements in the UUS data packets and transmit the appropriate standard elements to the public ISDN 30. In this light, a single interface may be implemented.

The standardized ISDN protocol elements received by the public ISDN switch 60 via the PRI D-channel 32 are converted to public ISDN control information in accordance with the requirements of the signaling system seven (SS7) network 65. The public ISDN control information is then forwarded to the signaling system seven (SS7) network 65. The SS7 network protocol is different from the signaling protocol used on the PRI D-channel 32, 34. As a result, control information passed between SS7 network 65 and the public ISDN switches commonly is manipulated as necessary by an interworking function in the public ISDN switches 60 and 70. After passing through the SS7 network 65, the public ISDN control information is received by the public ISDN switch 70.

The proprietary ISDN protocol elements encapsulated in UUS service data packets pass through each element in the public ISDN 30 without modification. That is, proprietary ISDN signaling protocol elements used for PBX feature control pass transparently in the UUS service data packets from the originating PBX 10 via the D-channel 32 through the public ISDN switch 60, SS7 network 65, and public ISDN switch 70 onto another PRI D-channel 34 to the destination PBX 20. Alternatively, the public ISDN 30 may use a separate data network, other than the SS7 network 65, to transport UUS service data packets between public ISDN switches 60 and 70.

The public ISDN switch 70 places the standard protocol elements and the proprietary protocol elements onto a D-channel 34 serving the primary rate interface between the public ISDN 30 and the destination PBX 20. The ISDN signaling protocol employed on the PRI D-channel is known as DSS1 (digital subscriber signal system number 1) which is a generic name for protocol on PRI D-channels. D-channel 32 and 34 are independent and unrelated. For example, D-channel 32 is a local D-channel from the originating PBX 10 to the public ISDN 30 and D-channel 34 is a local D-channel from the public ISDN 30 to the destination PBX 20.

The interface section 80 which interfaces the destination PBX 20 with the public ISDN 30 receives the call (information) through the D-channel 34 in two pieces; standard ISDN signaling protocol elements and proprietary ISDN signaling protocol elements encapsulated in UUS service data packets.

The unpacking of UUS data packets and the recombining of standardized ISDN signaling protocol elements and proprietary ISDN signaling protocol elements is performed by the interface section 80 and an exemplary implementation can be performed by an interworking function portion. The interface section 80 then reformats the standard and proprietary protocol elements into call/feature control data understood by the call processing section 90 of the destination PBX 20. The interworking function portion in the interface section 80 is similar to the interworking function portion in the interface section 50 described previously. Also, the interface section 80 can include one or more interfaces in the same manner as the interface section 50.

Once the public and proprietary protocol elements have been reformatted by the interface section 80, the call/feature control data is forwarded to PBX call processing section 90 for further desired processing including the signaling information related to PBX feature control that was transparently transported via the UUS service from the originating PBX 10 to the destination PBX 20.

FIG. 2 is a flow chart illustrating a preferred method of the present invention for transporting PBX features transparently across a switched public network. The method of FIG. 2 begins at an initial block 100.

At a process block 102, an originating PBX initiates a telephone call to a destination PBX over a switched public network.

At a process block 104, the originating PBX generates call/feature control data. The call/feature control data includes one or more standard ISDN protocol elements and one or more proprietary ISDN protocol elements.

At an optional process block 106, the originating PBX separates the call/feature control data into the standard ISDN protocol elements and the proprietary ISDN protocol elements.

At a process block 108, the originating PBX packs the proprietary ISDN protocol elements into a transparent data transport scheme.

At a process block 110, the originating PBX transmits the proprietary ISDN protocol elements (in the transparent data transport scheme) and the standard ISDN protocol elements over the switched public network to the destination PBX.

At a process block 111, the destination PBX receives the proprietary ISDN protocol elements (in the transparent data transport scheme) and the standard ISDN protocol elements from the originating PBX over the switched public network.

At a process block 112, the destination PBX unpacks the proprietary ISDN protocol elements from the transparent data transport scheme.

At an optional process block 114, the destination PBX recombines the proprietary ISDN protocol elements and the standard ISDN protocol elements to form the call/feature control data.

At a process block 115, the destination PBX processes the call/feature control data.

The method of FIG. 2 ends at a terminal block 116.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

What is claimed is:

1. A system for transporting private branch exchange features transparently across a switched public network, comprising:

an originating private branch exchange including,
  a call processing section for generating call/feature control data, the call/feature control data including one or more proprietary ISDN protocol elements and one or more standard ISDN protocol elements, and
  a first interface for coupling said originating private branch exchange to the switched public network, said first interface receiving the call/feature control data from said call processing section, packing the proprietary ISDN protocol elements into a transparent data transport scheme, and transmitting the proprietary ISDN protocol elements packed in the transparent data transport scheme and the standard ISDN signaling protocol elements over the switched public network; and
a destination private branch exchange including a second interface for coupling said destination private branch exchange to the switched public network, said second interface receiving the proprietary ISDN protocol elements in the transparent data transport scheme and the standard ISDN protocol elements, and unpacking the proprietary ISDN protocol elements from the transparent data transport scheme, whereby said transparent data transport scheme utilizes a user-user signaling data service packet.

2. The system according to claim 1, wherein the proprietary ISDN protocol elements include private branch exchange features.

3. The system according to claim 1, wherein said first interface includes a first interworking portion for sorting the call/feature control data into the standard ISDN protocol elements and the proprietary ISDN protocol elements and said second interface includes a second interworking portion for recombining the proprietary ISDN protocol elements in the transparent data transport scheme with the standard ISDN protocol elements to obtain the call/feature control data.

4. The system according to claim 1, wherein said call processing section determines a rout for the call and selects one of a plurality of first interfaces to couple said originating private branch exchange with the switched public network over which the call is to be routed.

5. The system according to claim 1, wherein the standard ISDN protocol elements transmitted over the switched public network and the proprietary ISDN protocol elements transmitted over the switched public network in the transparent data transport scheme are transmitted over a first common signaling channel between said originating private branch exchange and the switched public network and over a second common signaling channel between the switched public network and said destination private branch exchange.

6. A method for transporting private branch exchange features transparently across a switched public network, comprising the steps of:

initiating a call from an originating private branch exchange;

generating call/feature control data, the call/feature control data including one or more standard ISDN protocol elements and one or more proprietary ISDN protocol elements;

packing the proprietary ISDN protocol elements into a transparent data transport scheme;

transmitting the proprietary ISDN protocol elements in the transparent data transport scheme and the standard ISDN protocol elements over a switched public network to a destination private branch exchange; and unpacking the proprietary ISDN protocol elements from the transparent data transport scheme, whereby said transparent data transport scheme utilizes a user-user signaling data service packet.

7. The method according to claim 6, further including the step of routing the call according to a dialed number to one of a plurality of switched public networks.

8. The method according to claim 6, further including the steps of: separating the call/feature control data into the standard ISDN protocol elements and the proprietary ISDN protocol elements before packing the proprietary ISDN protocol elements in the transparent data transport scheme; and after unpacking the proprietary ISDN protocol elements from the transparent data transport scheme, recombining the proprietary ISDN protocol elements and the standard ISDN protocol elements to form the call/control feature data.

* * * * *